United States Patent
Hirsch (10) Patent No.: US 9,866,430 B2
(45) Date of Patent: Jan. 9, 2018

(54) COUNTERMEASURES TO A NETWORK MANAGEMENT LINK FAILURE

(71) Applicant: NOKIA SOLUTIONS AND NETWORKS OY, Espoo (FI)

(72) Inventor: Lucian Hirsch, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/431,530

(22) PCT Filed: Sep. 27, 2012

(86) PCT No.: PCT/EP2012/069066
§ 371 (c)(1),
(2) Date: Mar. 26, 2015

(87) PCT Pub. No.: WO2014/048474
PCT Pub. Date: Apr. 3, 2014

(65) Prior Publication Data
US 2015/0280976 A1  Oct. 1, 2015

(51) Int. Cl.
*H04L 12/24* (2006.01)
*H04W 24/04* (2009.01)
*H04L 12/703* (2013.01)
*H04L 29/08* (2006.01)

(52) U.S. Cl.
CPC ........ *H04L 41/0695* (2013.01); *H04L 41/044* (2013.01); *H04L 41/0659* (2013.01); *H04L 45/28* (2013.01); *H04L 67/104* (2013.01); *H04W 24/04* (2013.01)

(58) Field of Classification Search
CPC .................................................. H04L 41/0695
See application file for complete search history.

(56) References Cited

U.S. PATENT DOCUMENTS

2011/0051726 A1  3/2011  Bejerano et al.

FOREIGN PATENT DOCUMENTS

WO  WO 01/008334 A1  2/2001

OTHER PUBLICATIONS

3GPP TS 32.106-2 V3.3.0, technical specification, Part 2: Notification Integration Reference Point, Mar. 2001.*
International Search Report and Written Opinion dated Jun. 7, 2013 corresponding to International Patent Application No. PCT/EP2012/069066.

(Continued)

*Primary Examiner* — Jason Mattis
(74) *Attorney, Agent, or Firm* — Squire Patton Boggs (US) LLP (57) ABSTRACT

The present invention addresses apparatuses, methods and computer program product for providing enhanced improved network management. When a communication failure between an Element Management System and a super-ordinate Network Management System occurs, the Element Management System is switched over to forward event reports to a pre-defined peer Element Management System. In case the communication is re-established, the usual functionality is restored and the re-routing of event reports to the peer Element Management System is stopped.

14 Claims, 10 Drawing Sheets

(56) References Cited

OTHER PUBLICATIONS

ETSI TS 132 101 V9.0.0 (Jan. 2010), Technical Specification, Digital Cellular Telecommunications System (Phase 2+); Universal Mobile Telecommunications System (UMTS); LTE; Telelcommunication management; Principles and high level requirements (3GPP TS 32.101 version 9.0.0 Release 9), Jan. 2010, 65 pages.
3GPP TS 32.302 V11.0.0 (Sep. 2012), Technical Specification, 3rd Generation Partnership Project; Technical Specification Group Services and System Aspects; Telecommunication management; Configuration Management (CM); Notification Integration Reference Point (IRP); Information (IS) (Release 11), Sep. 2012, 27 pages.

* cited by examiner

COUNTERMEASURES TO A NETWORK MANAGEMENT LINK FAILURE

FIELD OF THE INVENTION

The present invention generally relates to wired or wireless communication networks, and more specifically relates to a method, apparatus and computer program product for enabling improved network management.

BACKGROUND

In networks, in particular in communication networks, the provision of information about events occurred in the managed network (e.g. alarms, state changes, configuration/relationship changes) in almost real-time to Network Management System (NMS) operators is of crucial importance for ensuring the service level agreement (SLA) negotiated with customers.

That means for example, that in the case the communication between an Element Management System (EMS) and a super-ordinate Network Management System (NMS) fails, e.g. due to data communication network (DCN) problems or faults on northbound management interface (Itf-N) communication equipment as example, it is necessary to re-route the event reports so that operators working on NMS are able to receive the information without significant delay.

Further, today customers still have to cope with temporary interruptions of communication between Agent and Managers on different management hierarchy levels (due to network or communication entities problems).

The consequences thereof are, as examples, a loss of notifications, i.e. less network supervision capability and delayed corrective measures, as well as a need for time-lasting synchronization procedures after the re-establishment of the communication.

It is to be noted that in the present application some operations defined in 3GPP standards (for management of wireless networks via northbound interfaces) only serve as examples, but the principles of the invention are valid for all kinds of telecom networks, communication protocols or management hierarchy levels, i.e. not only between EMS and NMS.

In general, a Telecommunication Management Network (TMN) principles define several layers for the hierarchical management of telecommunication networks, while each layer may play a dual role:

Manager role (in "managing system") for the subordinate layer (if available)

Agent role (in "managed system") for the next higher layer (if available).

For the day-to-day management of telecommunication networks usually two management layers are of special relevance:

The "Network Management" layer, whose functionality is provided by a Network Management Systems (NMS). In order to achieve a functional integration of different network areas (usually supervised by different, vendor-specific equipment) into a unique NMS, the interface between NMS and the (regional) Element Manager Systems (EMS) shall be vendor-independent.

The "Network Element Management" layer, whose functionality is provided by an Element Manager System (EMS, named also OMC) usually delivered by the same manufacturer like the managed Network Elements (NE). The EMS plays a Manager role with regard to the supervised network elements and provides Agent functionality to the superior NMS.

With regard to new required services, to multi-vendor equipment environments, multi-technologies and multi-domains to be supported simultaneously, the management of telecommunication networks (taking as example of a networks) needs to cope with increased size and complexity of the controlled networks. The consequences thereof may be for example:

a) Moving end-to-end, more complex supervision functions on higher management levels, i.e. leaving only dedicated, often vendor-specific management activities to be done on lower management systems.

b) Usage of multiple NMS, while some network events are significant only for dedicated NMS and other ones for all NMS.

An essential factor for efficient network supervision on NM level is the capability to synchronize the event information in the NMS with the current network condition. This is ensured by means of two interface communication patterns: event reporting, i.e. spontaneous forwarding of notifications in real-time, and request/response, while the reliable transmission of notifications in "near" real-time is especially significant.

The EMS interfaces to supra-regional NMS are provided by so-called Itf-N Agents, which transform the notifications generated in the managed NEs or in EMS itself according to the NMS-EMS object model ("event report mapping") and forward them subsequently over Itf-N under consideration of filtering criteria defined by the subscribed NMS.

As mentioned above, the provision of information about events occurred in the managed network (e.g. alarms, state changes, configuration/relationship changes) in "near" real-time to NMS operators is of crucial importance for ensuring the SLA negotiated with customers.

In the current literature, the aspects of securing event forwarding on management interfaces in case of agent functionality or communication path failures are usually related to the provision of redundant EMS resources, i.e. redundant agent instance and redundant Itf-N equipment. This option is not an optimal one, due to the additionally needed physical & logical resources in each EMS and their related costs.

SUMMARY OF THE INVENTION

Therefore, it is an object underlying the present invention to provide a network management optimization. In particular, it is an object of the present invention to provide a method, apparatus and computer program product for enabling improved network management.

According to a first aspect of the present invention, there is provided a method, comprising detecting a communication failure between an Element Management System and a super-ordinate Network Management System, establishing a communication to a pre-defined peer Element Management System connected to the same super-ordinate Network Management System, in case a communication failure is detected, and re-routing event reports of the Element Management System via the established communication to the peer Element Management System.

According to a second aspect of the present invention, there is provided an apparatus, which comprises detection means adapted to detect a communication failure between an Element Management System and a super-ordinate Network Management System, processing means adapted to establish a communication to a pre-defined peer Element Management System connected to the same super-ordinate Network Management System, in case a communication failure is detected, and transmission means adapted to re-route event reports of the Element Management System via the established communication to the peer Element Management System.

According to a third aspect of the present invention, there is provided a method, comprising receiving a message from a pre-defined Element Management System connected to a common super-ordinate Network Management System, the message indicating a failure of communication from the Element Management System to the common super-ordinate Network Management System, establishing a communication to the Element Management System, receiving event reports of the Element Management System via the established communication, and causing transmission of the received event reports to the super-ordinate Network Management System.

According to a fourth aspect of the present invention, there is provided an apparatus, which comprises communication means adapted to receive a message from a pre-defined Element Management System assigned to a common super-ordinate Network Management System, the message indicating a failure of communication from the Element Management System to the super-ordinate Network Management System, processing means adapted to establish a communication to the Element Management System, reception means adapted to receive event reports of the Element Management System via the established communication, and transmission means adapted to cause transmission of the received event reports to the common super-ordinate Network Management System.

According to a fifth aspect of the present invention, there is provided a computer program product comprising computer-executable components which, when the program is run on a computer, are configured to carry out the method according to the first aspect and/or the method according to the third aspect.

According to certain embodiments, the present invention provides a method to be implemented in Element Management System (EMS), for securing the event forwarding to Network Management System (NMS) under close temporal proximity in the above mentioned emergency case.

According to another embodiment of the invention, the communication between the Element Management System and the peer Element Management System is a peer-to-peer communication.

In another embodiment, the communication between the Element Management System and the super-ordinate Network Management System is carried out via a northbound management interface.

According to certain embodiments of the invention, the communication failure is detected when no periodic reception of the getSubscriptionStatus request triggered by NMS according to the timeTick value from the subscribe request is determined.

Furthermore, the event reports comprise at least one of alarms, state changes, configuration changes and relationship changes.

Still further, according to certain embodiments, an Element Management System comprises the apparatus according the second aspect and/or the fourth aspect.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a UMTS/HSDPA communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

It is to be noted that, for description of a concrete deployment as illustrative example, the following embodiments use the 3GPP CORBA-based Itf-N used for the management of mobile networks. Nevertheless the method principles are valid for all kinds of communication networks, used protocols or management hierarchy levels as well.

Figure 1:
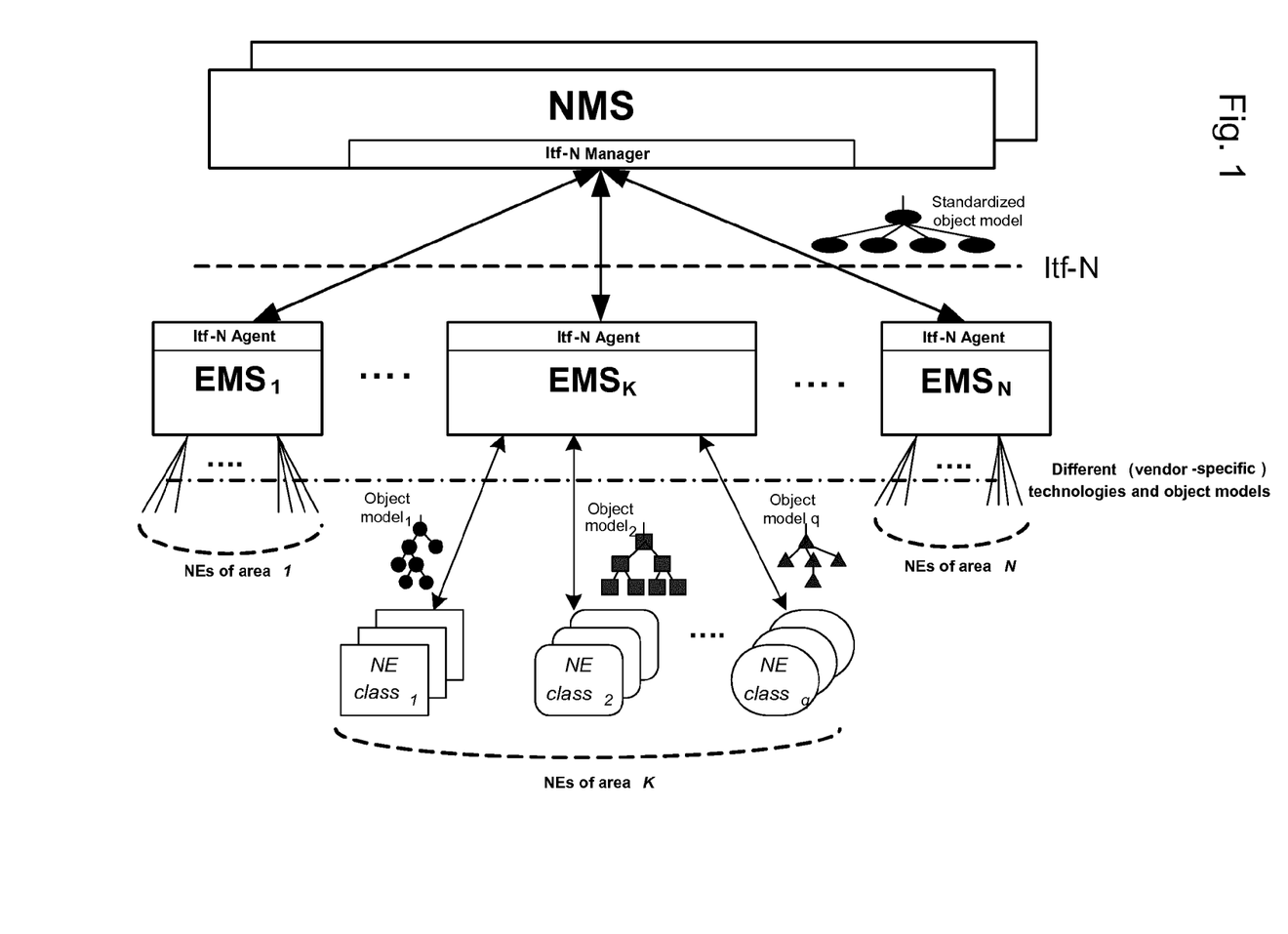
FIG. 1 schematically illustrates Element Management System—Network Element (EMS-NE) interfaces and Element Management System—Network Management System (EMS-NMS) so-called northbound management interfaces (Itf-N)

FIG. 1 schematically illustrates EMS-NE interfaces versus Itf-N.

According to certain embodiments, the Network Management System—Element Management System (NMS-EMS) communication occurs over so-called "northbound interfaces"(Itf-N), characterized in an object-oriented environment by a communication protocol (e.g. CORBA, SOAP, SNMP) and an object model (named NRM, Network Resource Model as well).

While the object models at EMS-NE interfaces are usually vendor-specific, the functionality and the related data model at Itf-N are standardized, in order to facilitate multi-vendor integration and to provide unified end-to-end management solutions to operators working on NM level.

With regard to new required services, to multi-vendor equipment environments, multi-technologies and multi-domains to be supported simultaneously, the management of telecommunication networks (taking as example mobile networks) needs to cope with increased size and complexity of the controlled networks.

The consequences thereof may be:
  Moving end-to-end, more complex supervision functions on higher management levels, i.e. leaving only dedicated, often vendor-specific management activities to be done on lower management systems.
  Usage of multiple NMS, while some network events are significant only for dedicated NMS and other ones for all NMS.

An essential factor for efficient network supervision on NM level is the capability to synchronize the event information in the NMS with the current network condition. This is ensured by means of two interface communication patterns: event reporting (i.e. spontaneous forwarding of notifications in real-time) and request/response, while the reliable transmission of notifications in "near" real-time is especially significant.

The EMS interfaces to supra-regional NMS are provided by so-called Itf-N Agents, which transform the notifications generated in the managed NEs or in EMS itself according to the NMS-EMS object model ("event report mapping") and forward them subsequently over Itf-N under consideration of filtering criteria defined by the subscribed NMS.

Figure 2:
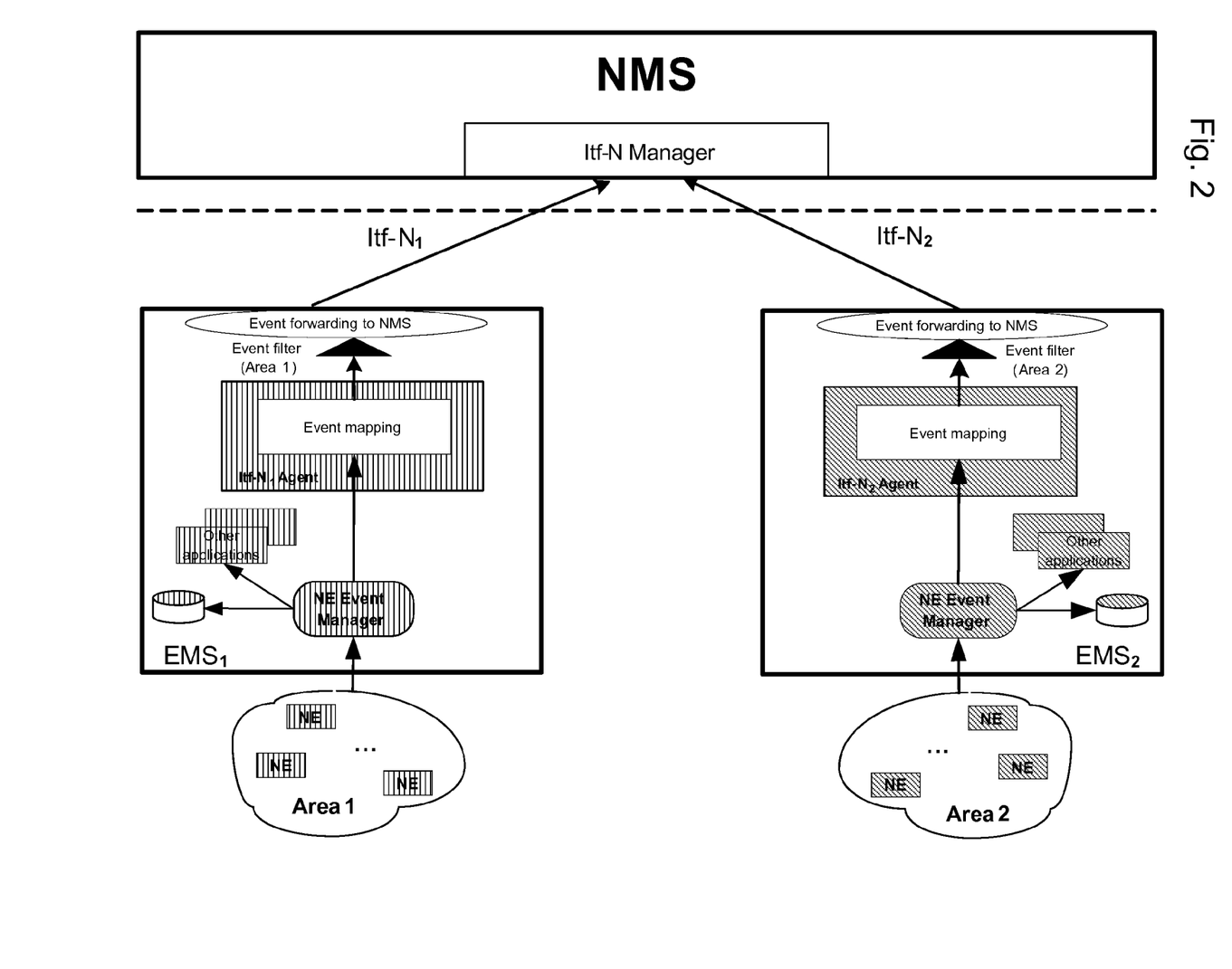
FIG. 2 shows a case wherein each EMS manages a dedicated area without communication to a neighbor EMS

FIG. 2 schematically shows a configuration wherein each EMS manages a dedicated area without communication to neighbor EMS.

According to certain embodiments, basic ideas of the present invention are:
  To each regional EMS a so-called "peer" EMS (supporting NEs of the same technology) is logically assigned, and communication parameters for emergency case are pre-configured.
  A new architectural approach, based on Agent with dual behavior, is implemented in EMS:
    a) In normal case, the Agent's functionality corresponds to a usual Itf-N Agent.
    b) In case of Itf-N communication failure, the Agent's behavior is switched over to a "Peer-to-Peer" Agent (P2P-Agent), able to communicate and to forward event reports to its pre-defined "peer" EMS (where a corresponding P2P-Manager is available) and to supervise permanently the Itf-N status condition
    c) In case the Itf-N communication is re-established, the usual Itf-N Agent functionality is restored and the re-routing of event reports to the "peer" EMS is stopped.

The 3GPP Standard TS 32.302 ("Notification Integration Reference Point (IRP): Information Service") defines (similar to standards of other bodies) a so-called subscription mechanism, providing to a Manager—independently of the used communication protocol—the capability to inform an Agent about the type and parameter values of the desired notifications.

In addition, the parameter timeTick in the subscribe request allows the EMS to supervise the NMS availability, i.e. the NMS must send a getSubscriptionStatus request within the interval defined by the timeTick value, otherwise EMS considers the Itf-N communication as failed.

The subscription mechanism offers to the Manager also the capability to suspend temporarily an already available subscription (suspendSubscription request) and to resume it (resumeSubscription request) at a later time. These requests are used for the communication between P2P Manager and P2P Agent in both "peer" EMS.

Figure 3:
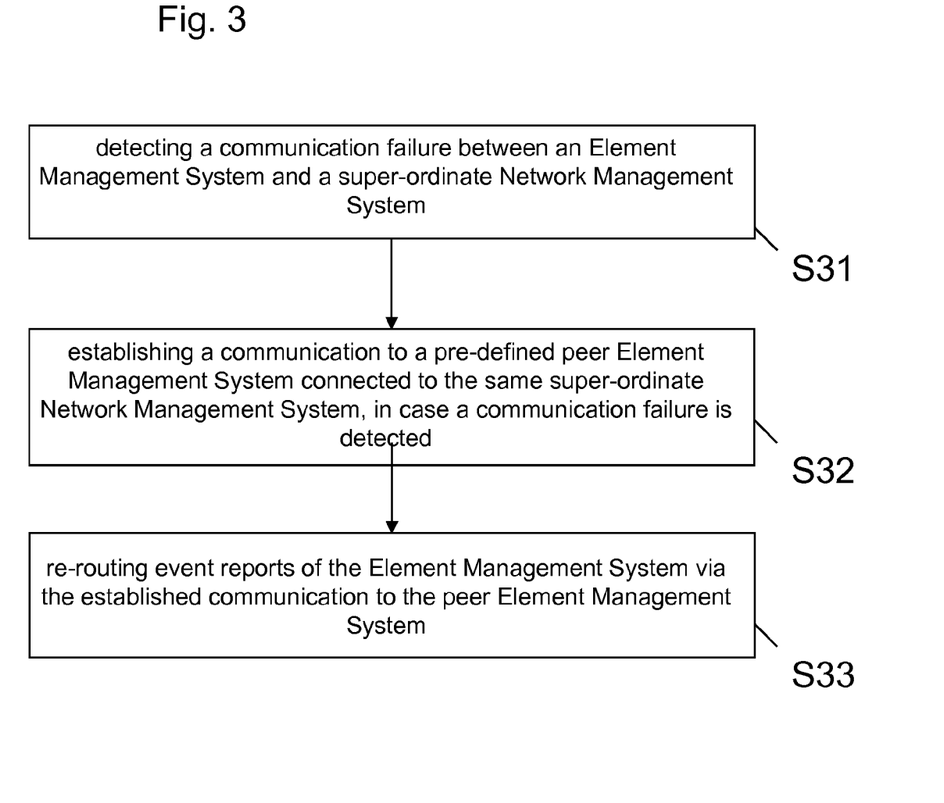
FIG. 3 shows a principle configuration of an example for a method according to certain embodiments of the present invention.

FIG. 3 shows a principle flowchart of an example for a method according to certain embodiments of the present invention.

In Step S31, a communication failure between an Element Management System and a super-ordinate Network Management System is detected.

In Step S32, a communication to a pre-defined peer Element Management System connected to the same super-ordinate Network Management System is established, in case a communication failure is detected.

In Step S33, event reports of the Element Management System are re-routed via the established communication to the peer Element Management System.

Figure 4:
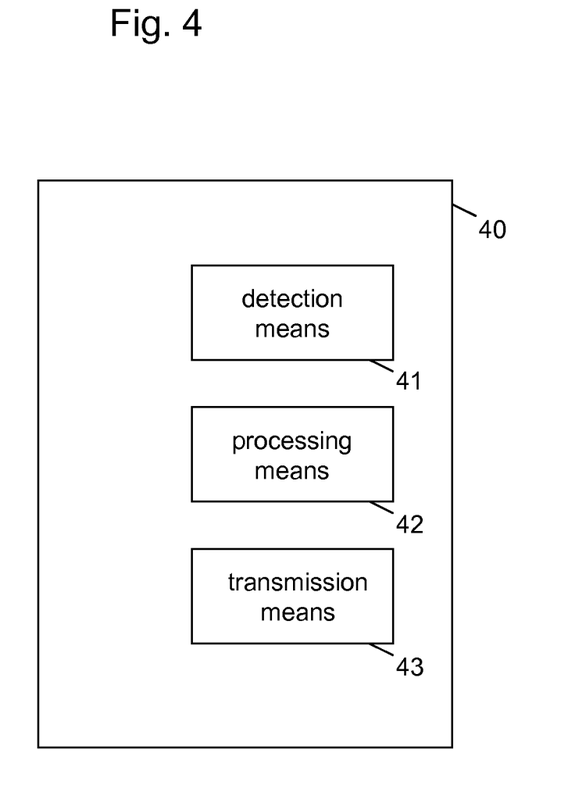
FIG. 4 shows a principle flowchart of an example for an apparatus according to certain embodiments of the present invention.

FIG. 4 shows a principle configuration of an example for an apparatus according to certain embodiments of the present invention. The apparatus 40 comprises detection means 41 adapted to detect a communication failure between an Element Management System and a super-ordinate Network Management System, processing means 42 adapted to establish a communication to a pre-defined peer Element Management System connected to the same super-ordinate Network Management System, in case a communication failure is detected, and transmission means 43 adapted to re-route event reports of the Element Management System via the established communication to the peer Element Management System.

Figure 5:
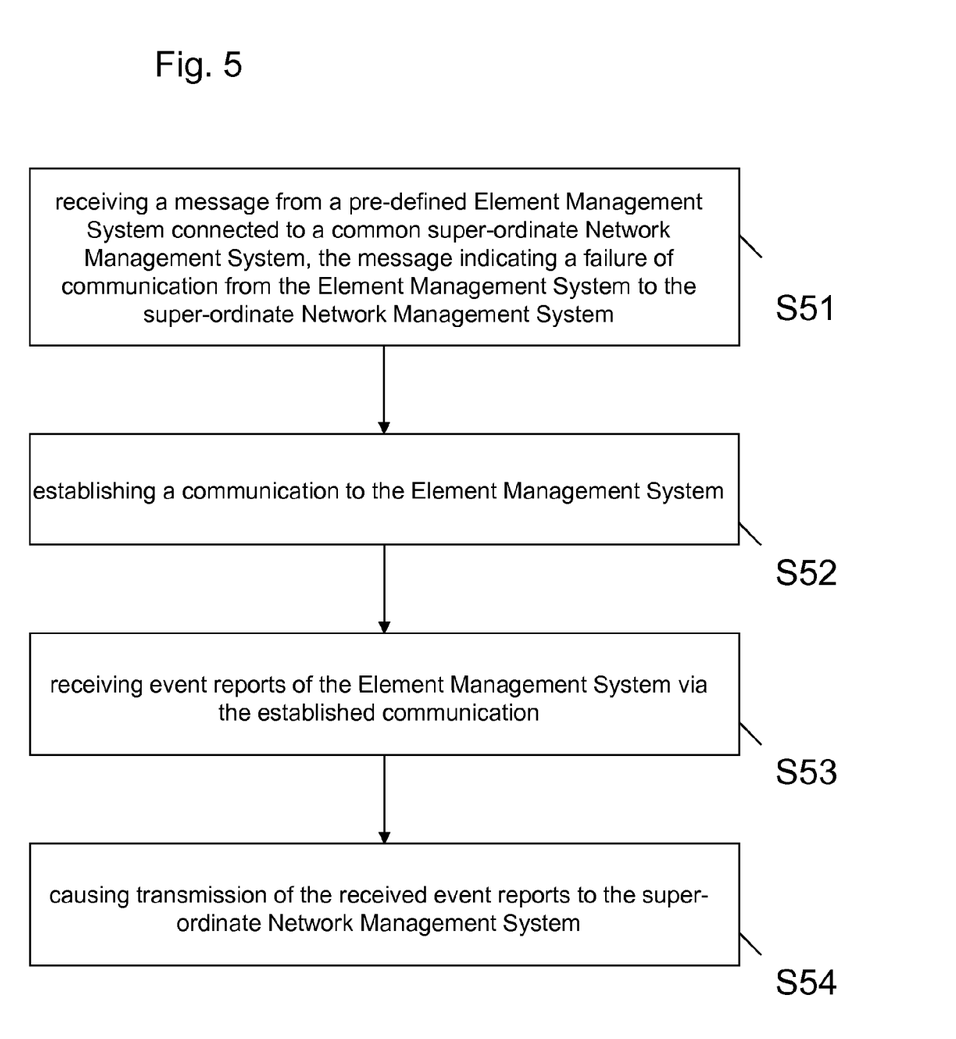
FIG. 5 shows a principle configuration of an example for a further method according to certain embodiments of the present invention.

FIG. 5 shows a principle flowchart of an example for a further method according to certain embodiments of the present invention.

In Step S51, a message from a pre-defined Element Management System connected to a common super-ordinate Network Management System is received, the message indicating a failure of communication from the Element Management System to the super-ordinate Network Management System.

In Step S52, a communication to the Element Management System is established.

In Step S53, event reports of the Element Management System are received via the established communication.

In Step S54, transmission of the received event reports to the super-ordinate Network Management System is caused.

Figure 6:
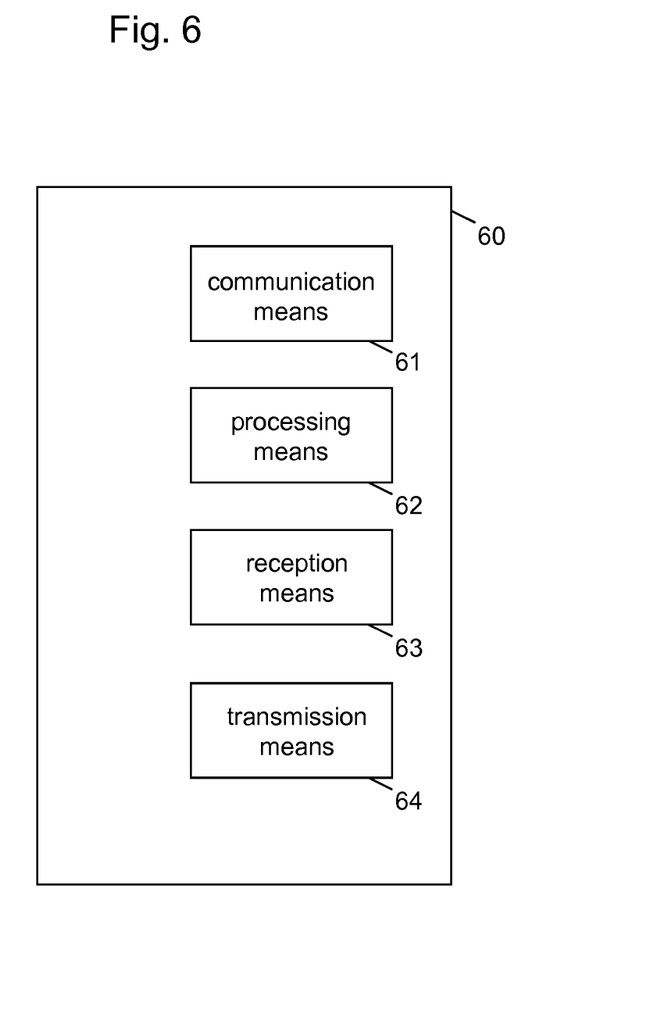
FIG. 6 shows a principle flowchart of an example for a further apparatus according to certain embodiments of the present invention.

FIG. 6 shows a principle configuration of an example for an apparatus according to certain embodiments of the present invention. The apparatus 60 comprises communication means 61 adapted to receive a message from a pre-defined Element Management System connected to a common super-ordinate Network Management System, the message indicating a failure of communication from the Element Management System to the super-ordinate Network Management System, processing means 62 adapted to establish a communication to the Element Management System, reception means 63 adapted to receive event reports of the Element Management System via the established communication, and transmission means 64 adapted to cause transmission of the received event reports to the super-ordinate Network Management System.

In the following, the implementation in two EMS is exemplarily described according to certain embodiments of the present invention, while $EMS_2$ is the "peer" of $EMS_1$ and vice-versa.

According to certain embodiments of the present invention, the following cases may occur:

A.) Both EMS are from the same vendor

A1.) Normal case, i.e. both EMS and their communication to NMS are operational (FIG. 7)

Figure 7:
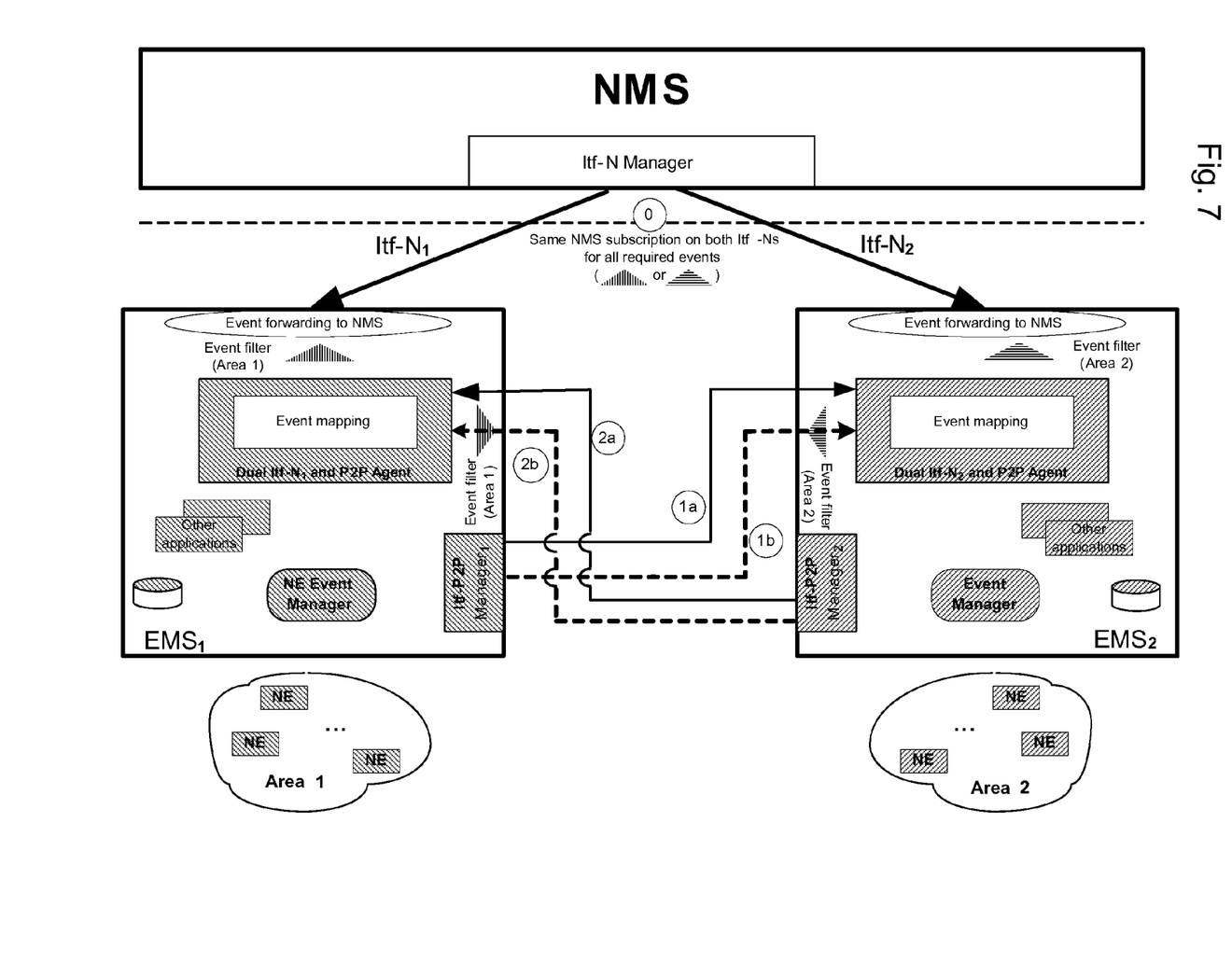
FIG. 7 shows pre-requisites for communication establishment on Itf-Ns and peer-to-peer (P2P) interfaces.

FIG. 7 schematically shows pre-requisites for communication establishment on Itf-Ns and P2P interfaces.

0.) In normal case, the NMS subscribes to both, $EMS_1$ and $EMS_2$ for the desired event notifications (marked with ⊙ in FIG. 7), indicating in the request a time Tick value as well.

1.) Further, the P2P-Manager in $EMS_1$ performs two subscription requests to the dual Itf-N and P2P-Agent in $EMS_2$:

1a One subscription for a special alarm (having a dedicated value of the specificProblem parameter) whose occurrence shall indicate that $EMS_2$ communication to NMS is interrupted (active alarm) or re-established (cleared alarm).

This subscription is always active.

1b subscription for all event notifications generated in the $EMS_2$ managed area.

This subscription, which contains the same filter settings as the NMS subscription to $EMS_2$, is immediately suspended.

Thereby, it is to be noted that, depending on $EMS_1$ overall performance, it is possible that this $EMS_1$ subscription relates only to a subset of the notifications usually sent by $EMS_2$ towards NMS (e.g. $EMS_1$ subscribes only for alarms with perceived severity values critical or major).

That means, during normal operation the $EMS_1$ does not receive any alarm (or any other event notification) originated in the $EMS_2$ managed area.

2.) In a similar way P2P-Manager in $EMS_2$ performs two subscription requests to the dual Itf-N and P2P-Agent in $EMS_1$ (marked in FIG. 7 with 2a and 2b) with the same meaning as described in paragraph 1) above.

3.) The dual Itf-N & P2P Agent of $EMS_1$ performs the mapping (according to the object model of the NMS-EMS interface) of the event reports originated in $EMS_1$ managed area and subsequently forwards the notifications to both:

Itf-N: the notifications are forwarded to NMS, since this subscription is active.

P2P (east-westbound) interface: the notifications are not forwarded to $EMS_2$, since this subscription is suspended.

Similarly, the dual Itf-N & P2P Agent of $EMS_2$ forwards notifications only to NMS, but not to to $EMS_1$ (whose subscription is suspended).

A2.) Failure case e.g. communication between $EMS_1$ and NMS is interrupted (FIG. 8)

Figure 8:
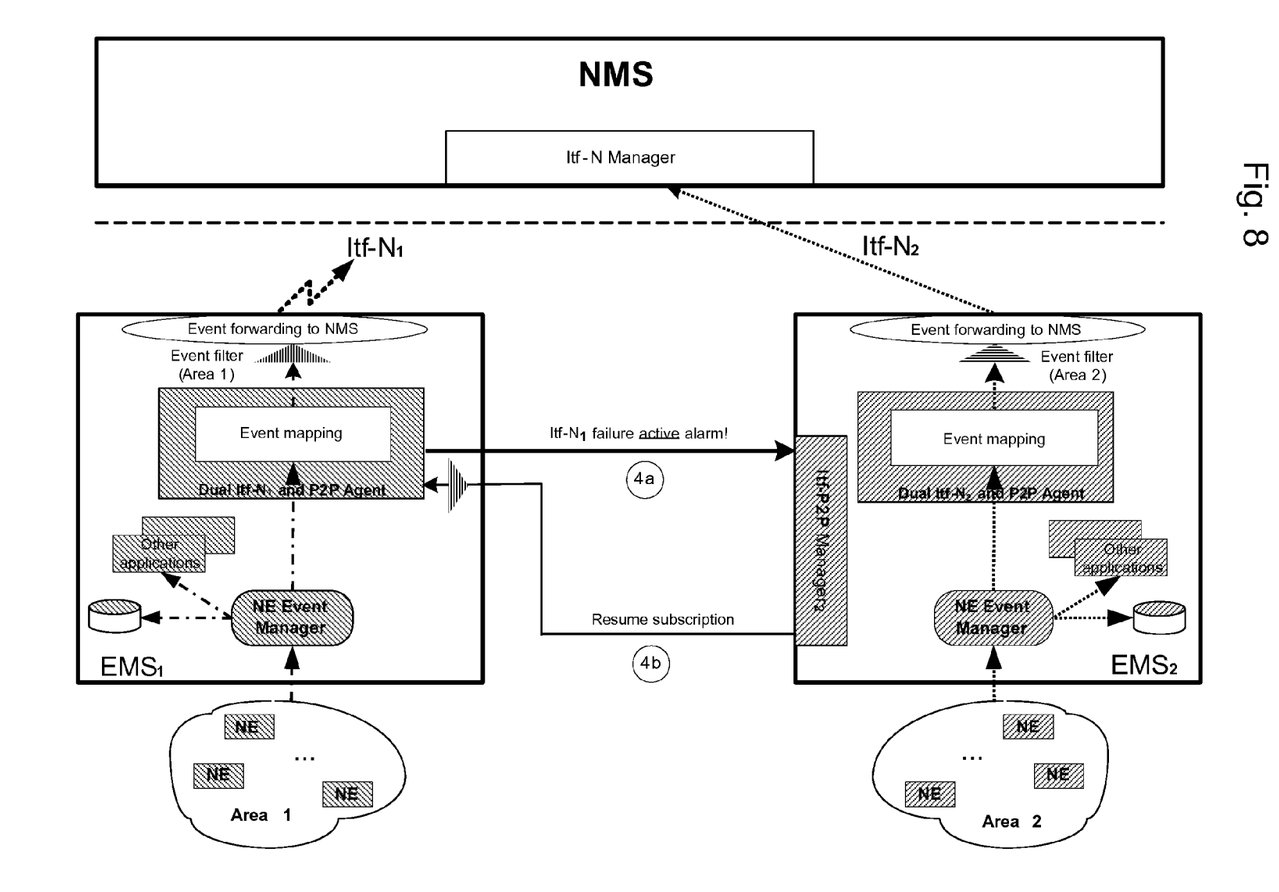
FIG. 8 shows setup redundant event forwarding in case of Itf-$N_1$ failure.

FIG. 8 schematically shows setup redundant event forwarding in case of Itf-$N_1$ failure.

In the case the Agent in $EMS_1$ discovers that the communication to NMS is interrupted (i.e. no periodic reception of the expected getSubscriptionStatus request according to the timeTick value from NMS subscribe request), the following steps are performed:

a) The dual Itf-N & P2P Agent of $EMS_1$ generates a special active alarm, indicating to $EMS_2$ the failure of NMS-$EMS_1$ communication (marked in FIG. 8 with 4a).

b) After reception of this special alarm, the P2P-Manager in $EMS_2$ resumes immediately its second (previously suspended) subscription (marked in FIG. 8 with 4b) by means of a resumeSubscription request.

Figure 9:
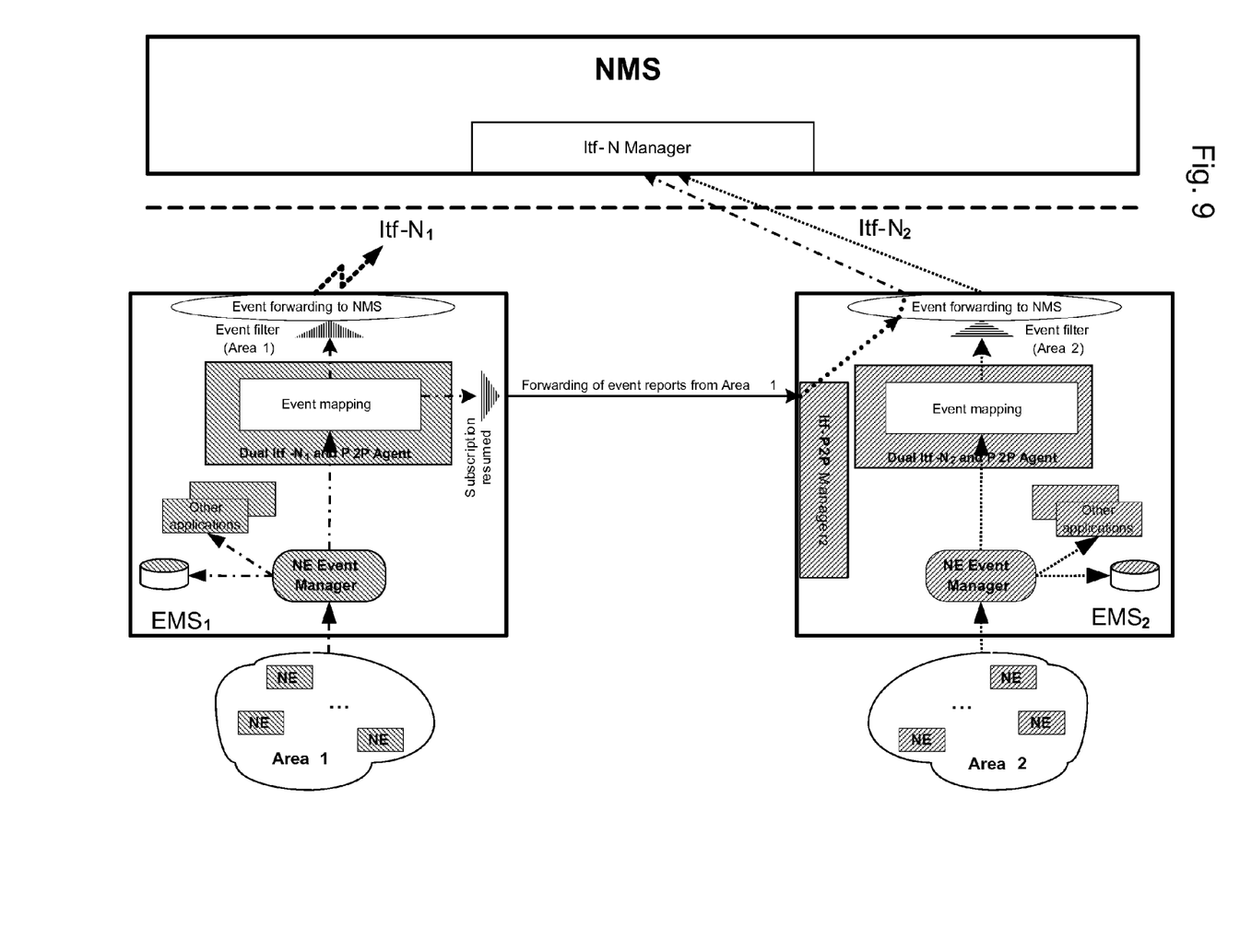
FIG. 9 shows provision of redundant event forwarding in case of Itf-$N_1$ failure.

Subsequently $EMS_2$ receives via the dual Itf-N and P2P-Agent of $EMS_1$ all event notifications from the network area managed by $EMS_1$ (FIG. 9).

FIG. 9 schematically shows the provision of redundant event forwarding in case of Itf-$N_1$ failure.

These notifications (e.g. alarms) are already mapped according to the NMS-EMS object model (i.e. they contain the unambiguous identifier "full DN" of the network resource managed by $EMS_1$), they passed the P2P subscription filter and therefore they don't need to be changed at all by the (dual) Itf-N Agent of $EMS_2$ but simply forwarded (by means of the Itf-P2P Manager component in $EMS_2$) towards the NMS.

In this manner the co-operation between the dual Itf-N & P2P Agent in $EMS_1$ and the P2P-Manager in $EMS_2$ provides an "ad-hoc" redundant event forwarding capability towards NMS.

Figure 10:
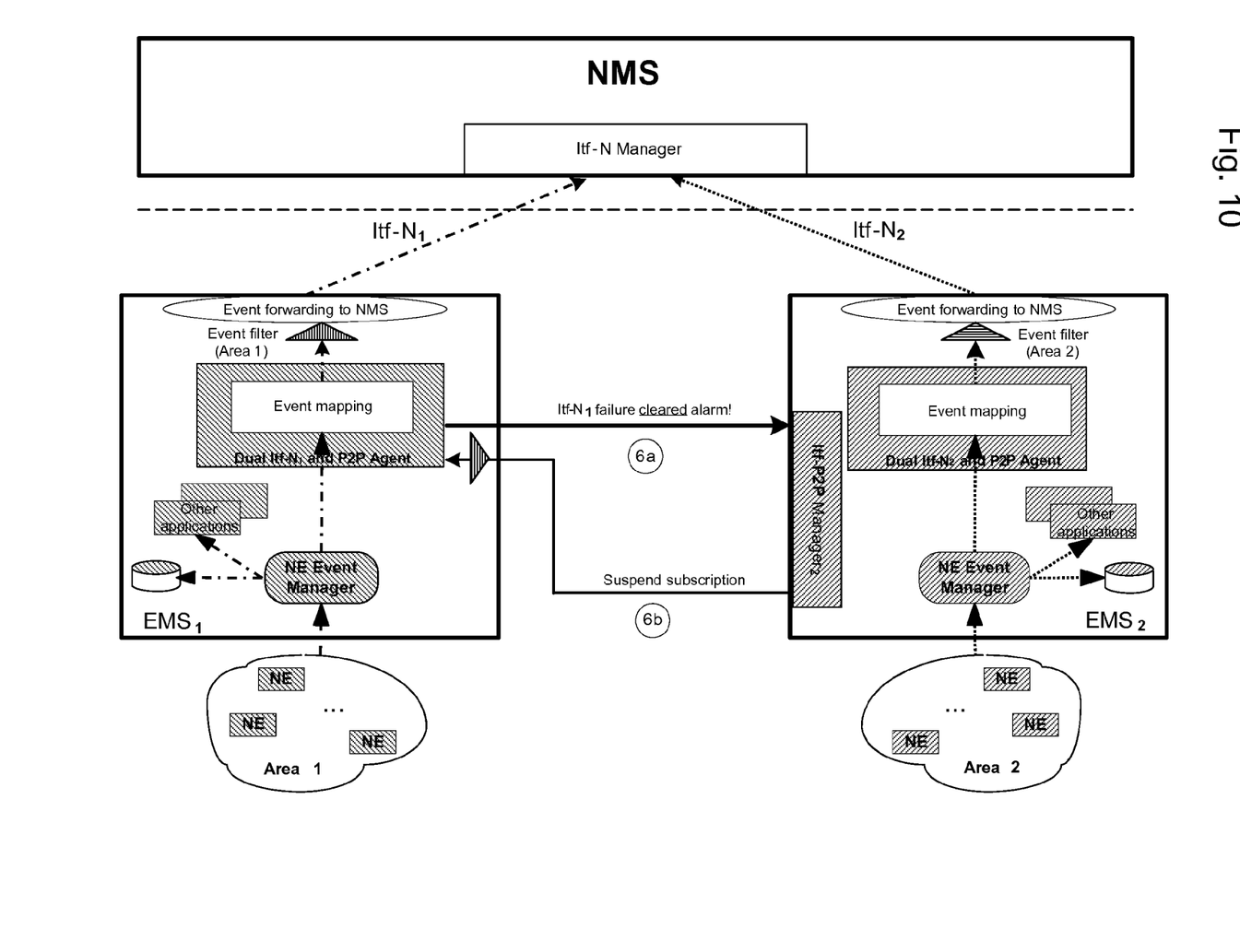
FIG. 10 shows a P2P message exchange after re-establishment of the NMS-$EMS_1$ communication according to certain embodiments of the present invention.

Furthermore, in the case the communication NMS-$EMS_1$ is re-established (e.g. DCN problem solved), the following steps are performed (FIG. 10):

FIG. 10 schematically shows P2P message exchange after re-establishment of the NMS-$EMS_1$ communication.

a. The dual Itf-N & P2P Agent of $EMS_1$ generates a special clear alarm, indicating to $EMS_2$ the re-establishment of NMS-$EMS_1$ communication (marked in FIG. 10 with 6a).

b. After reception of the clear alarm, the P2P-Manager in $EMS_2$ suspends immediately the second (previously resumed) subscription (marked in FIG. 10 with 6b) by means of a suspendSubscription request.

Subsequently $EMS_2$ does not receive anymore event notifications from the network area managed by $EMS_1$.

B.) $EMS_1$ and $EMS_2$ are from different vendors

In this case, it is possible that the Itf-N object models supported by the two EMSs are slighty different, e.g. due to some vendor-specific extensions of the standardized reference model.

The basic principles are similar as in the above described case A, nevertheless in case of NMS-EMS communication failures the NMS shall be prepared at any time to receive (via a single Itf-N) notifications about network resources modelled according to the two different object models.

To summarize, according to the present invention, at least the above mentioned drawbacks, i.e. loss of notifications, i.e.

less network supervision capability and delayed corrective measures, as well as need of time-lasting synchronization procedures after the re-establishment of the communication, can be avoided by the present invention.

In particular, according to certain embodiments, the present invention provides a software-based "ad-hoc" redundancy capability at the NMS-EMS management interfaces, avoiding any additional hardware.

Furthermore, the present invention is independent of specific telecom network domains, the protocol used on management interfaces and the involved management levels (Element Management, Network Management or Service Management).

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented as circuitry, in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under GSM, HSDPA, UMTS, LTE, WCDMA, WIMAX and WLAN and can advantageously be implemented also in controllers, base stations, user equipments or smart phones, or personal computers connectable to such networks. That is, it can be implemented as/in chipsets to connected devices, and/or modems thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
3GPP SA WG 5: 3rd Generation Partnership Program Systems Aspects Working Group 5
CORBA Common Object Request Broker Architecture
DCN Data Communication Network
DN Distinguished Name
EM Element Management
EMS Element Management System (Element Manager)
IRP Integration Reference Point
Itf-N Northbound management Interface
NE Network Element
NM Network Management
NMS Network Management System (Network Manager)
NRM Network Resource Model
OMC Operations and Maintenance Centre
P2P Peer to Peer
SLA Service Level Agreement
SNMP Simple Network Management Protocol
SOAP Simple Object Access Protocol
SW Software
TMN Telecommunication Management Network
TS Technical Specification

What is claimed is:
1. A method, comprising:
    detecting a communication failure between an Element Management System and a super-ordinate Network Management System;
    establishing a communication to a pre-defined peer Element Management System connected to the same super-ordinate Network Management System, in case a communication failure is detected; and
    re-routing event reports of the Element Management System via the established communication to the peer Element Management System so that events provided by a network element managed by an entity of the Element Management System continue to be provided to the entity of the Element Management System but from there events provided by the entity of the Element Management System follow a different route to the super-ordinate Network Management System with respect to events provided by the entity of the Element Management System prior to the detection of the communication failure.

2. The method according to claim 1, wherein, upon detecting that the communication failure is remedied, suspending the communication to the peer Element Management System.

3. The method according to claim 1, wherein the communication between the Element Management System and the peer Element Management System is a peer-to-peer communication.

4. The method according to claim 2, further comprising causing direct transmission of event reports of the Element Management System to the super-ordinate Network Management System.

5. The method according to claim 1, wherein the communication between the Element Management System and the super-ordinate Network Management System is carried out via a northbound management interface.

6. The method according to claim 1, wherein the communication failure is detected when no periodic reception of the getSubscriptionStatus request triggered by the Network Management System according to the timeTick value from subscribe request is determined.

7. A computer program embodied on a non-transitory computer-readable medium, said computer-readable medium comprising software code portions, said software code portions for controlling a processing device to perform the steps according to claim 1, when the program is run on the processing device.

8. An apparatus, comprising:
detection means adapted to detect a communication failure between an Element Management System and a super-ordinate Network Management System;
processing means adapted to establish a communication to a pre-defined peer Element Management System connected to the same super-ordinate Network Management System, in case a communication failure is detected; and
transmission means adapted to re-route event reports of the Element Management System via the established communication to the peer Element Management System so that events provided by a network element managed by an entity of the Element Management System continue to be provided to the entity of the Element Management System but from there events provided by the entity of the Element Management System follow a different route to the super-ordinate Network Management System with respect to events provided by the entity of the Element Management System prior to the detection of the communication failure.

9. An Element Management System, comprising the apparatus according to claim 8.

10. A method, comprising:
receiving a message from a pre-defined Element Management System connected to a common super-ordinate Network Management System, the message indicating a failure of communication from the Element Management System to the super-ordinate Network Management System;
establishing a communication to the Element Management System;
receiving event reports of the Element Management System via the established communication; and
causing transmission of the received event reports to the super-ordinate Network Management System so that events provided by a network element managed by an entity of the Element Management System continue to be provided to the entity of the Element Management System but from there events provided by the entity of the Element Management System follow a different route to the super-ordinate Network Management System with respect to events provided by the entity of the Element Management System prior to the detection of the communication failure.

11. The method according to claim 10, wherein, upon receiving a message from the Element Management System indicating that the communication failure is remedied, suspending the communication.

12. The method according to claim 10, wherein the communication to the Element Management System is a peer-to-peer communication.

13. The method according to claim 10, wherein the communication between the Element Management System and the super-ordinate Network Management System is carried out via a northbound management interface.

14. An apparatus, comprising:
communication means adapted to receive a message from a pre-defined Element Management System connected to a common super-ordinate Network Management System, the message indicating a failure of communication from the Element Management System to the super-ordinate Network Management System;
processing means adapted to establish a communication to the Element Management System;
reception means adapted to receive event reports of the Element Management System via the established communication; and
transmission means adapted to cause transmission of the received event reports to the super-ordinate Network Management System so that events provided by a network element managed by an entity of the Element Management System continue to be provided to the entity of the Element Management System but from there events provided by the entity of the Element Management System follow a different route to the super-ordinate Network Management System with respect to events provided by the entity of the Element Management System prior to the detection of the communication failure.

* * * * *